United States Patent
Tirca-Dragomirescu et al.

(10) Patent No.: US 10,001,113 B2
(45) Date of Patent: Jun. 19, 2018

(54) ROTARY CORE MODULAR SMA DEVICE

(71) Applicant: Exergyn Ltd., Dublin (IE)

(72) Inventors: Georgiana Tirca-Dragomirescu, Dublin (IE); Ronan Byrne, Dublin (IE); Rory Beirne, Dublin (IE); Kevin O'Toole, Dublin (IE)

(73) Assignee: EXERGYN LTD., Dublin (IE)

( * ) Notice: Subject to any disclaimer, the term of this patent is extended or adjusted under 35 U.S.C. 154(b) by 62 days.

(21) Appl. No.: 14/898,168

(22) PCT Filed: Jun. 13, 2014

(86) PCT No.: PCT/EP2014/062485
§ 371 (c)(1),
(2) Date: Dec. 14, 2015

(87) PCT Pub. No.: WO2014/198955
PCT Pub. Date: Dec. 18, 2014

(65) Prior Publication Data
US 2016/0138574 A1  May 19, 2016

(30) Foreign Application Priority Data
Jun. 13, 2013 (GB) .................................. 1310533.3

(51) Int. Cl.
*F03G 7/06* (2006.01)
(52) U.S. Cl.
CPC .................................... *F03G 7/065* (2013.01)
(58) Field of Classification Search
CPC ....................................................... F03G 7/065
See application file for complete search history.

(56) References Cited

U.S. PATENT DOCUMENTS

| | | | |
|---|---|---|---|
| 4,010,612 A | 3/1977 | Sandoval | |
| 4,027,479 A | 6/1977 | Cory | |
| 4,030,298 A | 6/1977 | Sandoval | |
| 4,037,411 A | 7/1977 | Hochstein | |
| 4,434,618 A | 3/1984 | Dillon | |
| 4,938,026 A | 7/1990 | Goldstein | |
| 5,150,770 A | 9/1992 | Secci | |
| 2006/0037315 A1 | 2/2006 | Zanella et al. | |
| 2007/0261307 A1 | 11/2007 | Alexander | |

FOREIGN PATENT DOCUMENTS

| WO | WO 8201400 A1 * | 4/1982 | ............ F03G 3/00 |
|---|---|---|---|
| WO | WO2007/134088 | 11/2007 | |
| WO | WO2010/131266 | 11/2010 | |

* cited by examiner

*Primary Examiner* — Jonathan Matthias
(74) *Attorney, Agent, or Firm* — Occhiuti & Rohlicek LLP

(57) ABSTRACT

The invention provides an energy recovery device comprising a first SMA core housed in a first immersion chamber and adapted to be sequentially filled with fluid to allow heating and/or cooling of the first SMA core wherein a first shaft is adapted to be turned by the SMA core mounted concentrically around said first shaft. The SMA core comprises a plurality of SMA elements to define a module, wherein a plurality of modules are mounted in series and whereby movement of a first module is configured to be input to a second module enabling cumulative rotation of the shaft.

8 Claims, 15 Drawing Sheets

1. Main Power Core (full bundle)
2. Relaxation Force Core (small bundle)
3. Linkage mechanism

ROTARY CORE MODULAR SMA DEVICE

CROSS-REFERENCE TO RELATED APPLICATIONS

This application is the National Stage of International Application No. PCT/EP2014/062485, filed on Jun. 13, 2014, which claims the priority of GB Application No. 1310533.3, filed on Jun. 13, 2013. The contents of these applications are hereby incorporated by reference in their entirety.

FIELD

The present application relates to the field of energy recovery and in particular to the use of shape memory alloys (SMA) for same. In particular the invention relates to a SMA device for use in mechanical systems.

BACKGROUND

Low grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEG's are relatively expensive. is Another largely experimental approach that has been proposed to recover such energy is the use of Shape Memory Alloys.

A shape-memory alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of shape-memory alloys are the copper-zinc-aluminium-nickel, copper-aluminium-nickel, and nickel-titanium (NiTi) alloys but SMAS can also be created, for example, by alloying zinc, copper, gold and iron.

The memory of such materials has been employed or proposed since the early 1970's for use in heat recovery processes and in particular by constructing SMA engines which recover energy from heat as motion.

In a first type, referred to as a crank engine, of which U.S. Pat. No. 4,683,72 is an example, convert the reciprocating linear motion of an SMA actuator into continuous rotary motion, by eccentrically connecting the actuator to the output shaft. The actuators are often trained to form extension springs. Some configurations require a flywheel to drive the crank through the mechanism's limit positions. A related type are Swash Plate Engines, which are similar to cranks except that their axis of rotation is roughly parallel to the direction of the applied force, instead of perpendicular as for cranks.

A second type are referred to as a pulley engines, an example of which is U.S. Pat. No. 4,010,612. In pulley engines, continuous belts of SMA wire are used as the driving mechanism. A pulley engine may be unsynchronized or synchronized. In unsynchronized engines, the pulleys are free to rotate independently of one another. The only link between different elements is rolling contact with the wire loops. In contrast, in synchronized engines, the pulleys are constrained such that they rotate in a fixed relationship. Synchronization is commonly used to ensure that two shafts turn at the same speed or keep the same relative orientation.

A third type of SMA engine may be referred to as field engines, an example of which is U.S. Pat. No. 4,027,479. In this category, the engines work against a force, such as a gravitational or magnetic field.

A fourth type of SMA engine is that of Reciprocating Engines of which U.S. Pat. No. 4,434,618 in an example. These reciprocating engines operate linearly, in a back-and-forth fashion, as opposed to cyclically.

A fifth type of SMA engine is that of Sequential Engines of which U.S. Pat. No. 4,938,026 is an example. Sequential engines move with small, powerful steps, which sum to substantial displacements. They work like an inchworm, extending the front part by a small step and then pulling the back part along. With the back part nearby, the front part can extend again.

A sixth type of SMA engine is shown in U.S. Pat. No. 5,150,770A, assigned to Contraves Italiana S.p.A., and discloses a spring operated recharge device. There are two problems with the Contraves device, namely it is difficult to recharge quickly in a reciprocating manner and secondly it is difficult to discharge the energy to a transmission system without losses occuring.

A seventh type of SMA engine is shown in US patent publication number US2007/261307A1, assigned to Breezway Australia Pty Limited, and discloses an energy recovery charge system for automated window system. Breezway discloses a SMA wire that is coupled to a piston which is used to pump fluid to a pressurised accumulator. The piston therefore moves in tandem with the SMA wire as it contracts and expands. By coupling the SMA wire to the piston in this manner, the SMA wire is in indirect communication with the energy accumulator via the pumped fluid which is inefficient and the Breezway system suffers from the same problems as Contraves.

Other patent publications in the art include U.S. Pat. Nos. 4,037,411; 4,030,298; WO2007/134088 and US2006/037315.

In addition one of the difficulties with each of these types of SMA engines has been that of the cycle period of the SMA material. SMA material is generally relatively slow to expand and contract (10's of RPM). It has been and remains difficult to achieve a worthwhile reciprocating frequency that might be usefully employed in an industrial application (100's to 1000's of RPM). This is not a trivial task and generally is complicated and involves significant parasitic power losses.

The present application is directed to solving at least one of the above mentioned problems.

SUMMARY

According to a first embodiment of the invention there is provided, as set out in the appended claims, an energy recovery device comprising:
 a first SMA core housed in a first immersion chamber and adapted to be sequentially filled with fluid to allow heating and/or cooling of the first SMA core wherein a first shaft is adapted to be turned by the SMA core mounted concentrically around said first shaft.

In another embodiment of the invention there is provided a modular energy device comprising a first SMA core housed in an immersion chamber and adapted to be sequentially filled with fluid to allow heating and/or cooling of the first SMA core wherein a shaft is adapted to be rotated by the first SMA core mounted concentrically around first shaft; and the first SMA core comprises a plurality of SMA elements to define a module, wherein a plurality of modules are mounted in series and whereby movement of a first module is configured to be input to a second module enabling cumulative rotation of the shaft.

The creation of the nested or modular core obtains the maximum contraction of the SMA wires in a small space. The cumulative effect of the deflection for each segment of SMA wire is the solution to obtain a more compact design. This design offers an improved heat transfer as opposed to the linear arrangement of the nested core. It is also avoiding the positive pressure pulse given by the piston in the case of a linear nested core.

It will be appreciated that the cumulative movement can be provided by anchoring each core at the outside and using the resistance of the wires in the core to resist the backward movement of the outer race of the central clutch, the rotation of the successive cores can be transmitted through the shaft. Cumulative movement is still achieved but there is no requirement to move each core to a new "starting" position by translational movement in conjunction with the prior core.

In one embodiment there is provided at least one lever mechanism is adapted to extend the stroke of said SMA wires during heating of the core.

In one embodiment the SMA elements are selected from different lengths of SMA material.

In one embodiment the SMA core is divided into a plurality of shorter elements, mounted radially around the circumference of shaft.

In one embodiment the deflection of each of the elements are a function of the length of the element.

In one embodiment the first core is mounted on the shaft in a spoked wheel arrangement.

In one embodiment there is provided a modular valve adapted to increase the overall efficiency of the heat engine optimised on a predefined profile based on the SMA core.

In one embodiment the predefined profile can be controlled by varying the length of the SMA core.

According to a second embodiment a modular valve is adapted to increase the overall efficiency of the heat engine.

This type of direct activation SMA valve, besides fulfilling the intended purpose of letting the fluid in and out of the cores, allows the improvement of the heat transfer to, and the time of reaction of, the SMA, by placing the wires in a horizontal position (the fluid strikes a greater amount of the surface of the wire in the same time, so the activation of the SMA is done instantly). The modular arrangement allows for the power output to be adapted according to specific tasks, without compromising the manufacturing process. This is done by creating identical rotary modules and adding as many as is necessary.

According to another embodiment the invention offers a solution to obtain a larger displacement from SMA wires without increasing the height of the housing in which they are contained. This results in the device requiring less volume, and hence increases the engines power density. The power stroke of the SMA device is increased while decreasing the force of said displacement. This allows for the use of more standardised parts, which otherwise would need to be custom components which could cope with the high forces and low displacements generated by the SMA wires.

According to another embodiment there is provided a solution to the loss of work associated with an antagonistic SMA wire arrangement through the introduction of the SMA springs. This new arrangement allows for a greater deflection and work to be extracted from the SMA contractions and expansions.

The invention also removes the need for relaxation springs, further improving the magnitude of work which the SMA produces. In addition to this, the arrangement allows for work to be continuously supplied to an output shaft, via the transmission disclosed (or other). This is preferable to a non-antagonistic system where work will only be extracted during wire contraction (heating), and will halt when expanding (cooling).

Due to the continuous work output, this invention can be used to rotate a cam shaft, which could be used to drive a valve train. This would allow for the valves in the system to govern the flow of the fluids which power them. This represents greater system efficiency, as it will eliminate the requirement for external power.

According to another embodiment there is provided means for a relaxation force (provided by shape memory alloy) needed for the SMA bundle in order to achieve the austenite to martensite transformation.

In another embodiment of the invention there is provided a SMA core for use in an energy recovery device, said core comprises a plurality of SMA elements to define a module, wherein a plurality of modules are mounted in series on a rotatable shaft and whereby movement of a first module is configured to be input to a second module enabling cumulative rotation of the shaft.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

A shape memory alloy (SMA) actuator to recover and convert low grade heat to mechanical work is described in unpublished PCT patent application number PCT/EP2012/074566, assigned to Exergyn Limited, and incorporated herein fully by reference.

It will be appreciated that while SMA material/core is substantially described herein with respect to the Figures, the invention can be applied to a class of materials more generally known as 'active material' or Negative Thermal Expansion (NTE) materials. NTE materials include those compositions that can exhibit a change in stiffness properties, shape and/or dimensions in response to an activation signal, which can be an electrical, magnetic, thermal or a like field depending on the different types of active materials. Preferred active materials include but are not limited to the class of shape memory materials, and combinations thereof. Shape memory materials, a class of active or NTE materials, also sometimes referred to as smart materials, refer to materials or compositions that have the ability to remember their original shape, which can subsequently be recalled by applying an external stimulus (i.e., an activation signal).

First Embodiment

The energy recovery device of the invention offers a more compact alternative as to using extremely long wires of SMA to obtain a significant deflection for applications where space is limited.

Figure 1A:
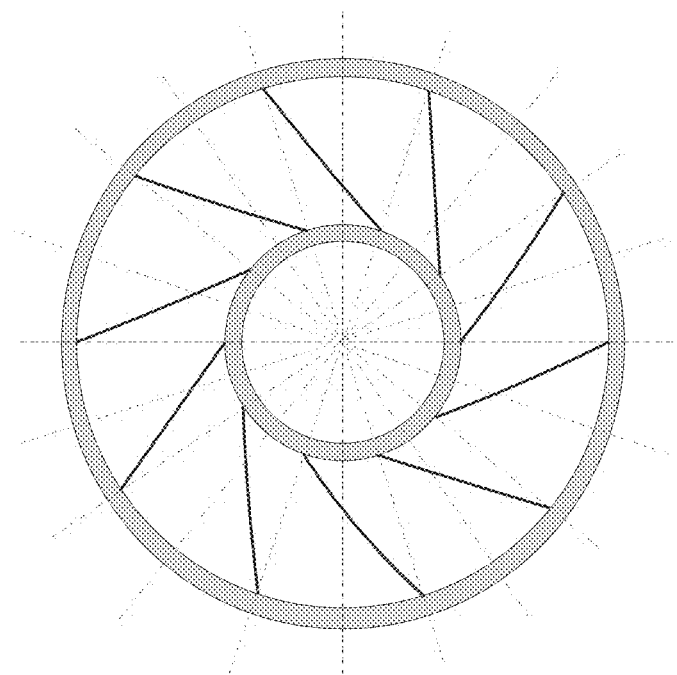
FIG. 1 illustrates a modular SMA Core a) top view of a rotary module; b), c) schematic representation of the core in two different embodiments.

If one considers the example of a 1 m long SMA wire, a 4% deflection would mean a contraction of 0.04 m. If the application for which this contraction is necessary needs a more compact design the solution would be to split the long SMA wire into shorter ones. This design is efficient only if the deflection obtained for all the smaller segments of SMA is accounted for as having a cumulative effect, as illustrated in FIG. 1.

In the present invention, the SMA material is divided into a plurality of shorter elements, mounted radially around the circumference of a module. In this way, the deflection of each of the shorter individual lengths will only be a function of the length of the element, however power output can be maintained as the total mass of wire is maintained. The SMA core comprises a plurality of SMA elements to define a module, wherein a plurality of modules are mounted in series and whereby movement of a first module is configured to be input to a second module enabling cumulative rotation of the shaft.

For example, by splitting the 1 m long SMA wire in shorter segments, a deflection of 4% would be obtained for each of these segments and by using a cumulative effect for these deflections a total contraction of 0.04 m will be obtained in a fraction of the space needed as for the 1 m long SMA wire, were it to be mounted linearly.

Figure 1B:
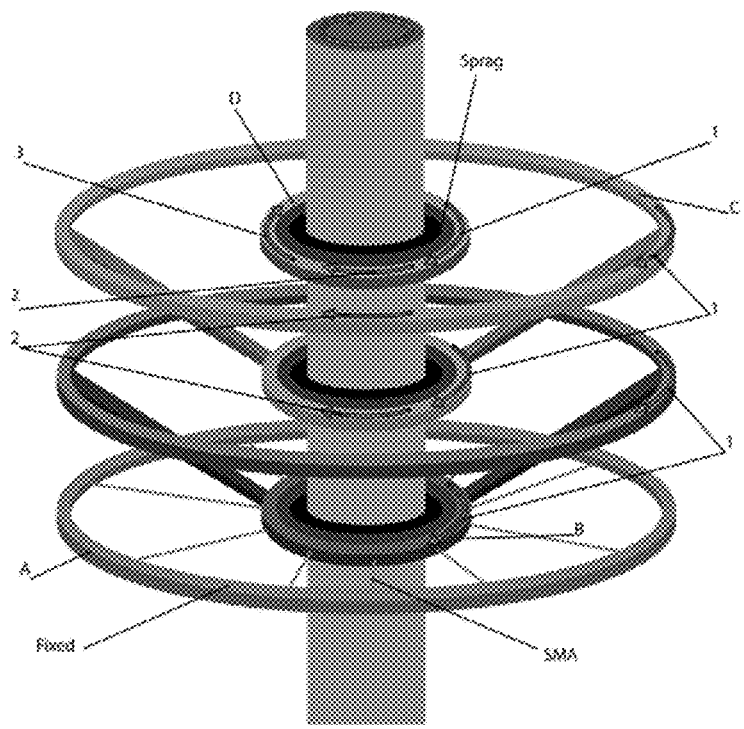

Modules of the SMA material as described above are then mounted adjacently and connected in a serial manner such that each core is moved through a distance corresponding to that of the displacement of the SMA on the immediately prior core. This new position then becomes the starting point for activation of the SMA in this core. This sequence continues through the multiple cores. The net effect is that the stroke of the SMA is progressively accumulated over all of the cores, thus enabling an amplification of the stroke, as shown in FIG. 1b.

Figure 1C:
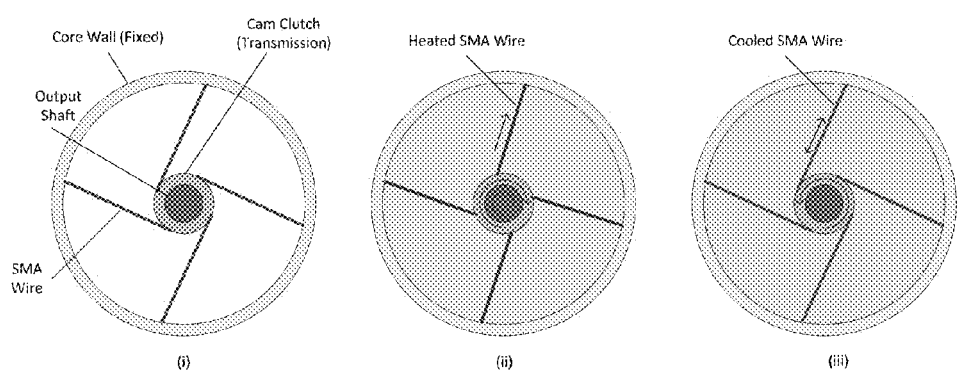

The embodiment of the invention presented in FIG. 1c presents the use of CAM clutches as a means of power transmission from the SMA wires to an output shaft. The CAM clutch will allow transmission of this power in one direction, while freewheeling in the other to allow the SMA to be returned to their starting position. It is intended that the output shaft be connected to a component so as to allow for the generation of electricity.

FIG. 1.c) (ii) shows that as the core heats, the SMA components contract, transmitting work to the CAM clutch, which in turn rotates the output shaft. When the core cools (FIG. 1.c) (iii)) the SMA components expand and a return force is exerted and the core returns to its initial state whereby the rotation that is created is not transmitted to the output shaft. It is this operation of unidirectional transmission of work (SMA→Shaft) which will allow for the cumulative rotational output of multiple rotary cores.

Another advantage inherent in the energy recovery system is the enhanced heat transfer regime that is permitted by mounting of the SMA elements transversely in the fluid flow field. This ensures that the maximum possible surface area is exposed to the fluid flow at a given time, thus ensuring enhanced heat transfer and power output for the given mass of wire.

Figure 2A:
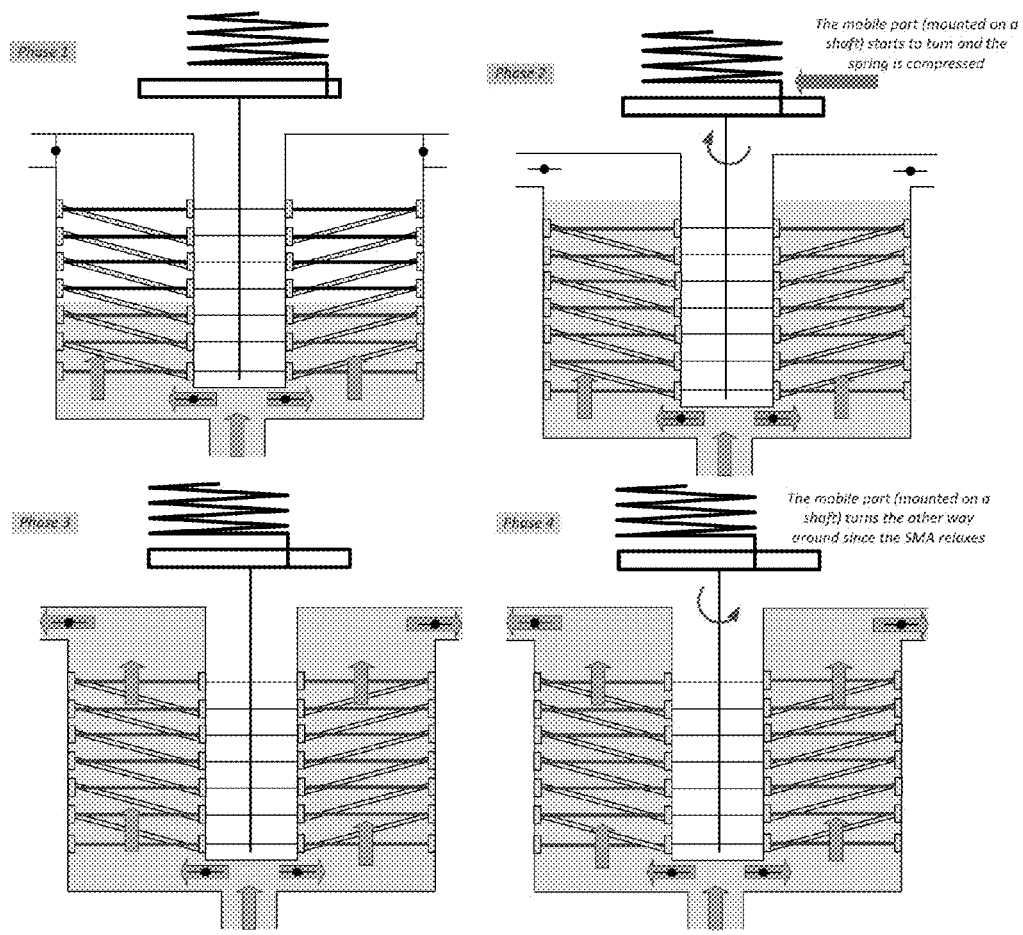
FIG. 2a) illustrates the principle of the modular SMA core according to one embodiment of the invention, namely 1b)

As seen in FIG. 2a) fluid is fed into the hub containing the modules of shape memory alloy. Using the concept of immersion in fluid to activate the SMA wire the modules are engaged gradually and the rotation is transmitted directly to the central shaft. A return spring or other mechanism is used to ensure that the SMA wires are returned to their starting (martensitic) state when heating has finished and cooling commences (FIG. 2a)).

Figure 2B:
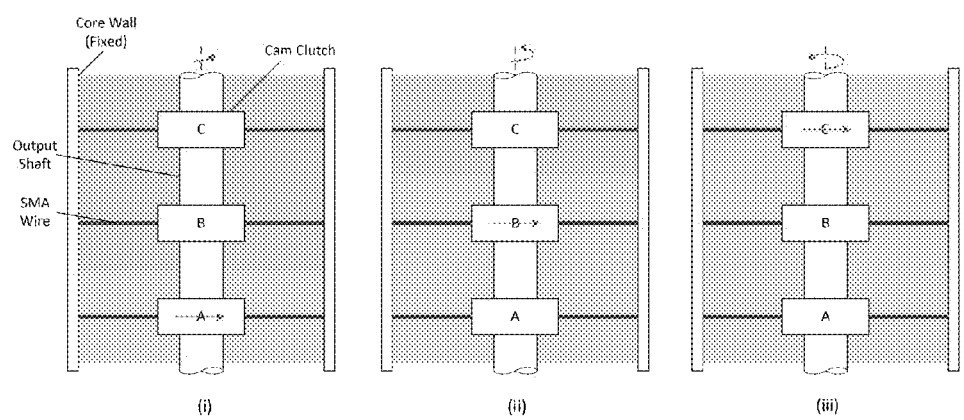
FIG. 2b) illustrates the principle of the modular SMA core according to one embodiment of the invention, namely 1c)
Figure 3:
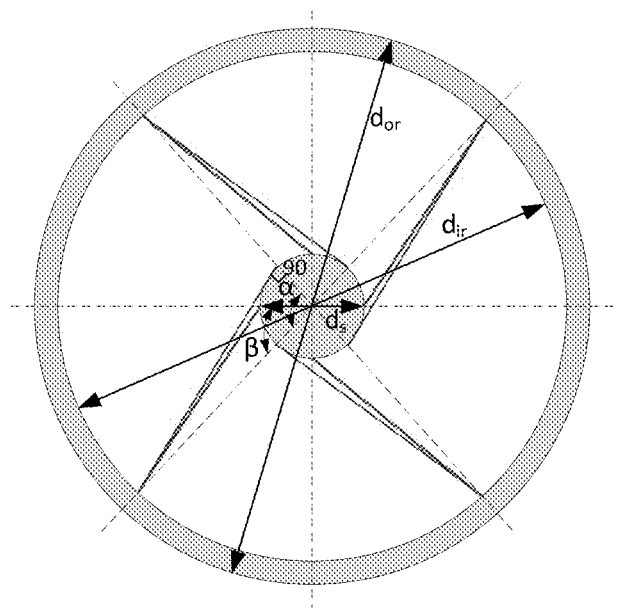
FIG. 3 illustrates a plan view of the SMA Core.

FIG. 2b) (i) shows that as the first rotary module, denoted "A", is activated by heated fluid such that it actuates causing the output shaft to rotate, while not effecting the other modules B and C. After module A has fully actuated, module B is activated by the heated fluid. It can be seen from FIG. 2b) (ii) that as B rotates, this angular displacement is transmitted to the output shaft where modules A and C are not affected. This operation can be seen again in FIG. 2b) (iii) whereby C is actuated, and A and B are not. It is this operation that should allow each module to operate independently of each other while at the same time providing an accumulative displacement effect on the output shaft.

Model of the Modular SMA Core

Decision parameters:
1. inner diameter ($d_{ir}$) of the support ring for the wires (the outer diameter—$d_{or}$ will be a design decision)
2. the shaft diameter ($d_{shaft}$)
3. the deflection of the wire (martensite→austenite) x=4%
4. imposed rotation of the shaft y=90° (minimum rotation needed to open/close the valve)

Step I:
Calculation of the martensite wire length:

$$l_{martensite}=\text{sqrt}(r_{ir}^2-r_{shaft})$$

Step II:
Calculation of the length of the SMA wire (austenite state—red line FIG. 1.c)

$$l_{austenite}=l_{martensite}-l_{martensite}*X$$

Step III:
Calculation of the α angle:

$$\alpha=\arcsin(l_{martensite}/r_{ir})$$

Step IV:
Calculation of the β angle (cosine rule):

$$\beta=\arccos((r_{shaft}^2+r_{ir}^2-l_{austenite}^2)/(2*r_{ir}*r_{shaft}))$$

where $r_{ir}$ is the radius of the support ring

Step IV:
Calculation of the rotation of the central shaft:

$$\Delta=\alpha-\beta$$

Step V:
Calculation of the number of rotational modules needed to obtain the imposed rotation:

$$no_{layers}=\gamma/\Delta$$

Second Embodiment

Low temperature waste heat is a valuable source that has the potential to produce useful energy and in this way it increases the overall efficiency of a number of different systems such as power generators, propulsion engines and industrial waste heat.

One arrangement of the SMA wires in rotary modules (layers) improves the heat transfer between the water and the SMA wire and achieve the instant activation. The increase in diameter allows for significant SMA wire length. This facilitates the production of a useful SMA contraction that can be utilised. The invention provides for the accumulative movement of SMA wires in adjacent cores to produce a longer stroke than would otherwise not be possible using a single wire arrangement. The invention provides for the use of different lengths of SMA wire in adjacent SMA cores for the express purpose of producing a specific valve opening profile.

The development of the heat engine concept includes the target of self-sufficiency i.e. minimum possible parasitic power loads. This goal can be achieved by eliminating the external power sources required to power auxiliary systems. One of the elements that would need external power would be the control valves used to direct fluid to and from the central power chambers. Presently, technologies that might be used would be solenoid valves, however it will be appreciated that valves that are powered by direct coupling to the drive shaft can also be used. It will be understood that neither of these is ideal as they effectively require the use of external work to perform their useful effect. A more advantageous method by which to power such valves is to use a waste-heat powered actuator.

The present invention provides a valve that is using this low grade waste heat source of useful energy to power it.

In this way, it is also possible for a cascade system to be created, whereby the valves would use the water that exits the main power-producing cores to be activated. This arrangement (cascade) would increase the overall efficiency of the heat engine.

Figure 4A:
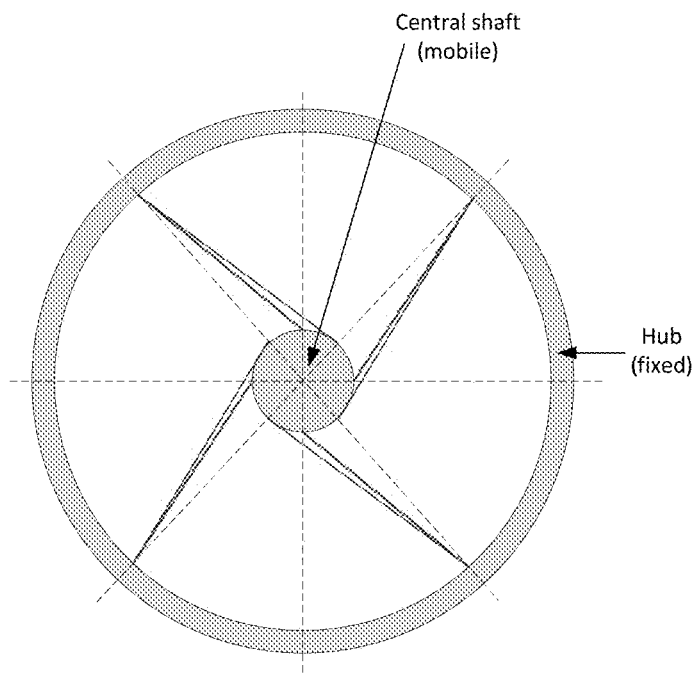
FIG. 4 illustrates (a) SMA wire mounting and behaviour in hot and cold states (b) Schematic of Rotary Valve concept.
Figure 4B:
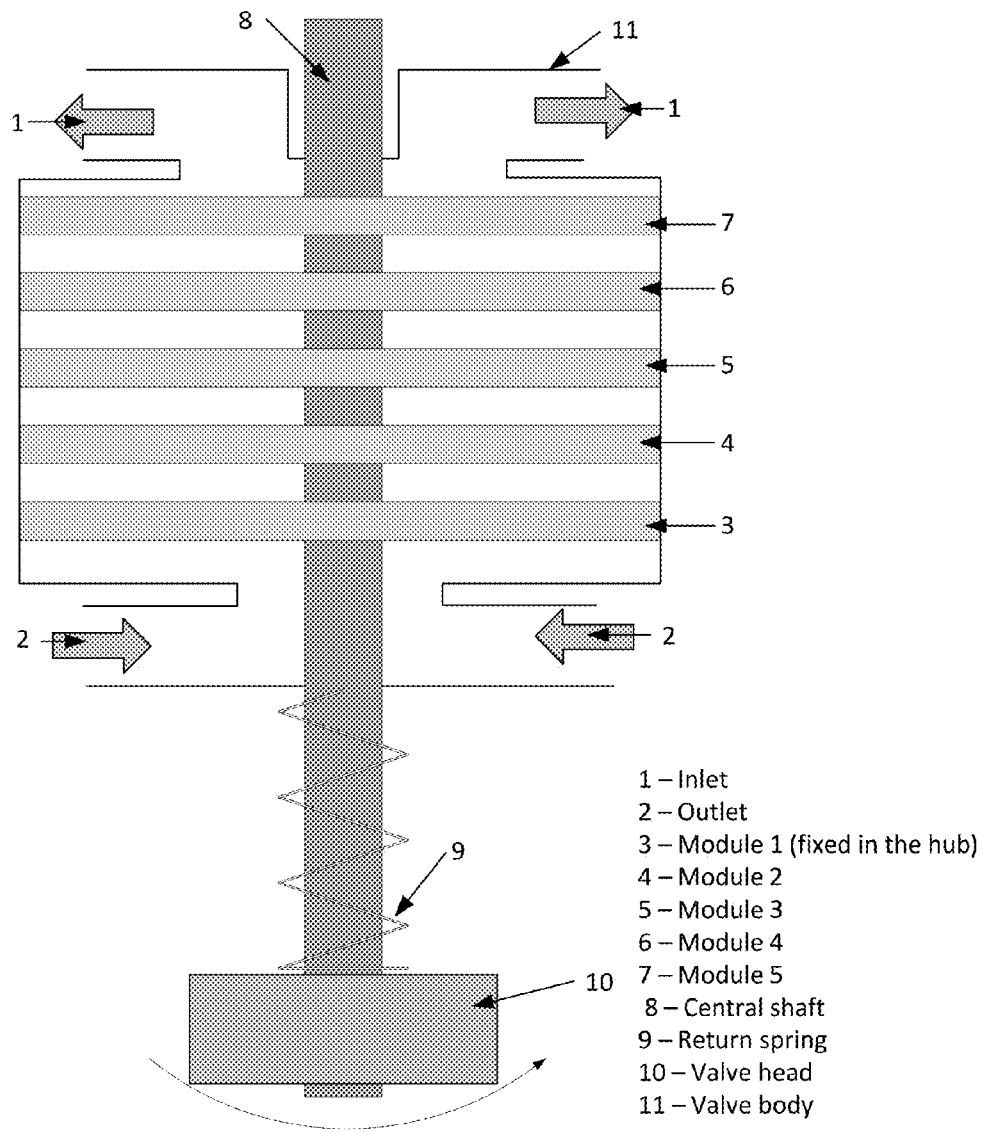

Description of the Valve:

The rotary modules are mounted on a central shaft (FIG. 4 B and indicated by reference numeral 8) that will rotate as the SMA wires are activated by the hot water striking their surface (FIG. 4a). Only the bottom rotary module is fixed on the hub (FIG. 4. B indicated by reference numeral 3), the others are free to rotate with respect to the previous module (FIG. 4. B indicated by reference numeral 4-7). By choosing this type of mounting, a relative rotation is obtained, maximizing the torque transmitted to the spring that will actuate the valve (FIG. 4 b). The main advantage of this transverse arrangement of the SMA material is the improved heat transfer over that which would be possible using other arrangements (for example mounted longitudinally). The SMA instantly activates because the water strikes the entire surface of the wire (the dynamic response of the SMA is improved).

Working principle of the valve:

As the water strikes the bottom rotary module the mounted SMA wires contract, causing rotation by an angle A, before stopping, at which point the module remains fixed.

In a first embodiment of the device, the following modules (FIG. 4) rotate with the same angle as the first one (relative motion). As the water strikes the second module, the SMA wires will contract and rotate the remaining modules placed on top. This same principle applies for all the rotational modules of this direct activation SMA valve. In this manner, the cores engage sequentially and the total deflection experienced by the valve shaft is maximised.

Model of the Modular SMA Valve:

Decision parameters:
1. inner diameter ($d_{ir}$) of the support ring for the wires (the outer diameter—$d_{or}$ is will be a design decision)
2. the shaft diameter ($d_{shaft}$)
3. the deflection of the wire (martensite→austenite)x=4%
4. imposed rotation of the shaft γ=90° (minimum rotation needed to open/close the valve)

Step I:
Calculation of the martensite wire length:

$$l_{martensite}=\text{sqrt}(r_{ir}^2-r_{shaft})$$

Step II:
Calculation of the length of the SMA wire (austenite state—red line FIG. 4.c)

$$l_{austenite}=l_{martensite}-l_{martensite}*x$$

Step III:
Calculation of the α angle:

$$\alpha=\arcsin(l_{martensite}/r_{ir})$$

Step IV:
Calculation of the β angle (cosine rule):

$$\beta=\arccos((r_{shaft}^2+r_{ir}^2-l_{austenite}^2)/(2*r_{ir}*r_{shaft}))$$

where $r_{ir}$ is the radius of the support ring

Step IV:
Calculation of the rotation of the central shaft:

$$\Delta=\alpha-\beta$$

Step V:
Calculation of the number of rotational modules needed to obtain the imposed rotation:

$$no_{layers}=\gamma/\Delta$$

Figure 5:
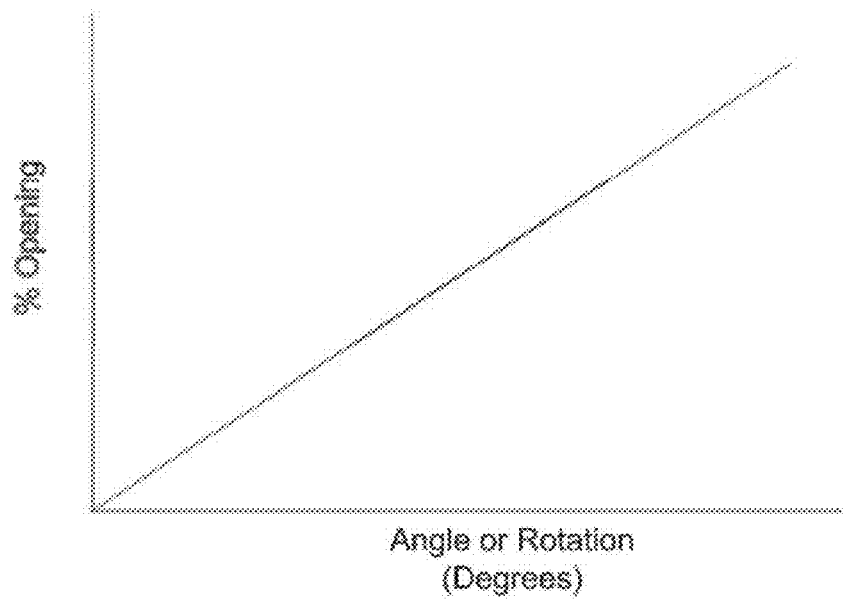
FIG. 5 illustrates percentage of opening for the modular valve depending on the angle of rotation of each modul.

FIG. 5 illustrates the percentage of opening for the modular valve depending on the angle of rotation of each module. FIG. 5 shows a sample opening profile for the case of the simple modular arrangement. FIG. 4 shows a sample opening profile for the case of an optimized profile.

Figure 6A:
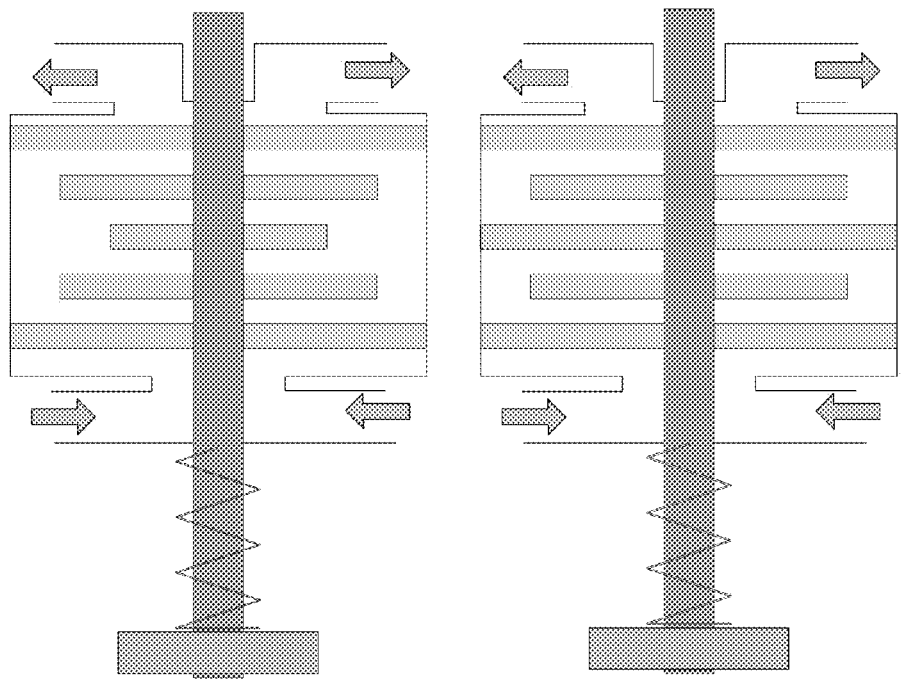
FIG. 6a & 6b illustrates embodiments of the modular SMA valve.
Figure 6B:
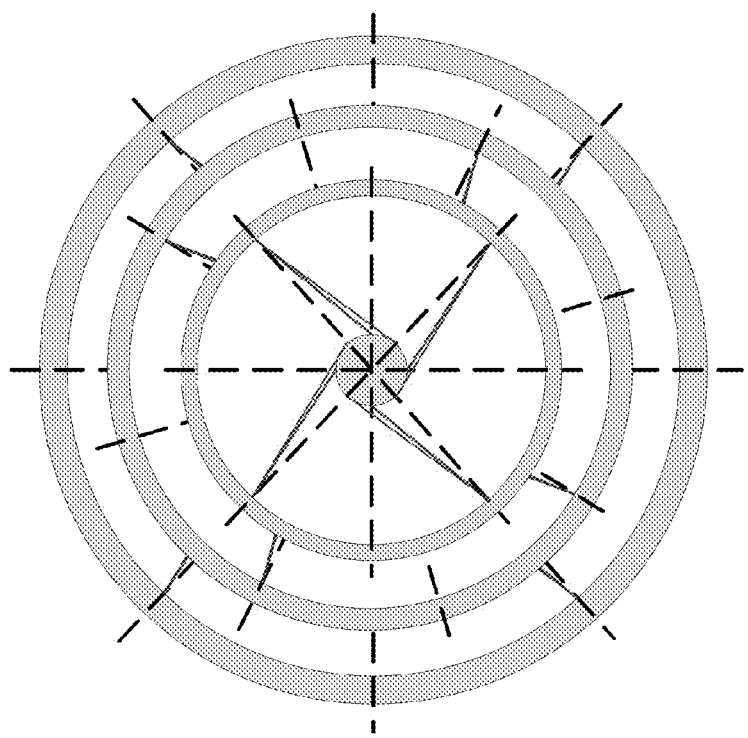

The opening/closing of the valve can be optimised on a certain predefined profile through the optimal design of the wire modules. This custom profile can be achieved by varying the length of the SMA wire in the modules relative to each other, as shown in FIG. 6. The mounting modular profiles can therefore have different diameters as well. By having different length wires the angle to which the central shaft rotates can vary, thus the gradually opening/closing of the valve can be obtained. This principle is demonstrated in FIGS. 6 and 7. The dynamic response of the SMA depends on the thickness of the wire. For this type of modular valve a thinner wire is recommended to be used (e.g. 1.5 mm diameter) in order for the fast opening/closing of the valve to be achieved.

It will also be appreciated that in cases where it is required to have greater power available, all that is required is an increase in the mass of SMA enclosed in the device. This may be achieved through the inclusion of larger diameter wire, or longer wire, or both. It is therefore possible not only to optimize the opening profile of the valve actuator in terms of simple displacement but also in terms of instantaneous force delivered.

Third Embodiment

In another embodiment there is provided a novel arrangement of SMA wires and lever mechanisms in order to extend the stroke of said SMA wires during immersive heating. The SMA wires and lever mechanisms would be located in a singular power producing core. The increased stroke along with the reduced force is desirable as it allows for the transmission used to convert this work in to rotational movement to be manufactured using more standardised parts.

Figure 8:
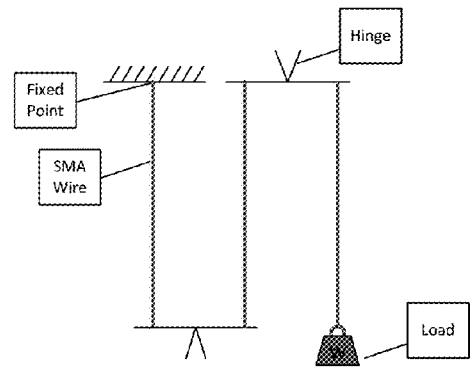
FIG. 8 illustrates lever mechanisms that can be used to connect multiple SMA wires of the same length in series within a core.

One embodiment of the arrangement uses levers to amplify the SMA wire stroke. These levers can be used to connect multiple SMA wires of the same length in series within a core, and will represent a 1:1 displacement transmission. This arrangement will result in a combined stroke of the contraction caused by one wire multiplied by the number of wires separated by levers. FIG. 8 illustrates the discussed arrangement, while FIG. 9 shows the operation of the mechanisms.

Figure 9:
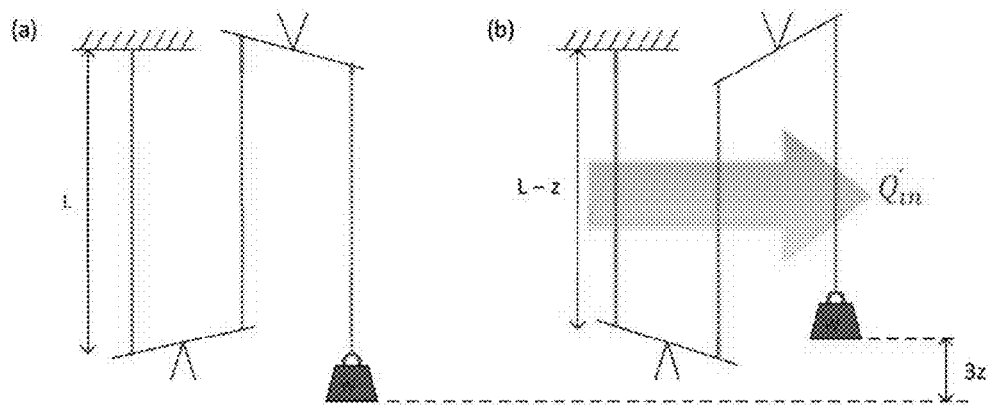
FIG. 9 illustrates operation of the lever mechanisms of FIG. 8.

It can be seen in FIG. 9(a) that in its cooled or martensitic state, the SMA wires will be pulled taught by the load, "W". The length of each individual wire in this phase is denoted as "L". As the core is heated immersively, as shown in FIG. 9(b), each core contracts by a length "z". Hence, each wire now measures "L−z"in length. Due to the wires being connected in series between the fixed point and the load, as well as wires being able to transmit deflections to one another (from left to right in this example), the overall deflection undergone by the load will be equal to the sum of the deflections caused by caused by the individual SMA wires. In the example shown in FIG. 9, the deflection can be seen to be "3z". Hence the main desirable result from this arrangement is that it amplifies the length of deflection exerted on the load, while not affecting the height of the core.

It will also be understood that a multitude of embodiments are possible through the combination of different lever sizes and SMA material lengths. This is achievable through the eccentric positioning of the lever hinge point, thus enabling an amplification of the stroke. Similarly, the use of different lengths of SMA wire in the working elements enable the selection of a suitable io stroke amplification. This is because, as is generally known, the contraction length of the SMA material is a function of the starting length of the wire i.e. the wire in its cold (martensitic) state.

Figure 10:
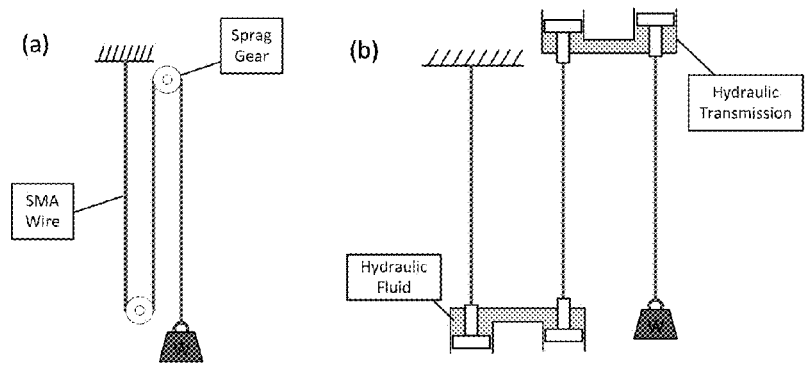
FIG. 10 illustrates alternative embodiments of the concept using (a) sprag gears and (b) hydraulic transmissions.

While the examples disclosed thus far implement levers for stroke amplification, the arrangement is not limited to their use. It is possible to realise the energy recovery device using other mechanisms in place of these levers. FIG. 10 illustrates alternative embodiments of the concept using (a) sprag gears and (b) hydraulic transmissions. These arrangements can operate in the same way as the levers by transmitting deflections from each wire to the next.

Figure 11:
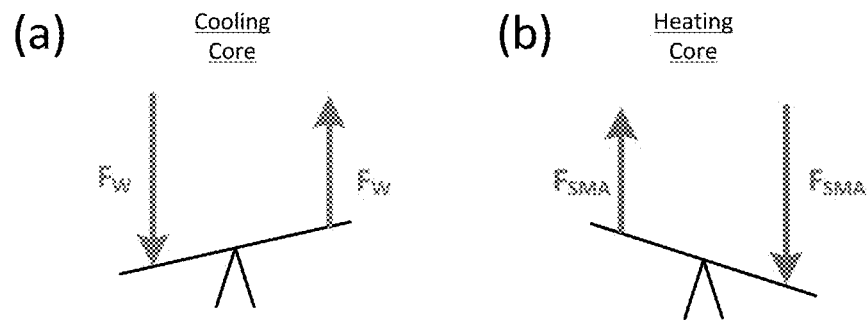
FIG. 11 shows the present forces acting on the levers during the (a) cooling and (b) heating cycles

In order to design the lever mechanisms appropriately, it is necessary to perform a stress analysis. In particular, the lever should undergo constant bending stresses. The bending stress will alter cyclically when the system moves from cooling to heating cycles, and vice versa. FIG. 11 illustrates these bending stresses.

It can be seen from FIG. 11 shows the present forces acting on the levers during the (a) cooling and (b) heating cycles. During cooling the force acting on the lever will be transmitted from the load ($F_W$) through the SMA wires. During heating, the force will be applied to the load through the contraction of the SMA wires ($F_{SMA}$) which will act in the opposite direction of the forces exerted on the lever during cooling. These forces will be acting on a beam supported by the lever located at its centre, hence the forces acting on the beam can be said to represent bending stress. Therefore, this beam must be design in such a way that it will not fail as a result of this bending stress. The magnitude of bending stress present can be determined using the following equation;

$$\sigma_{bending} = \frac{My}{I_x}$$

Where M=moment about the neutral axis, y=the perpendicular distance to the neutral axis, and $I_x$=second moment of area about the neutral axis x.

The max allowable bending stress ($\sigma_{max\ bend}$) which a material can withstand is represented as 0.5~0.6 of the materials yield strength ($\sigma_y$);

$$\sigma_{maxbend} = 0.6\sigma_y$$

Therefore, the relevant material and geometry should be selected for the lever beam using the considerations outlined above.

Hydraulic Transmission

Figure 12:
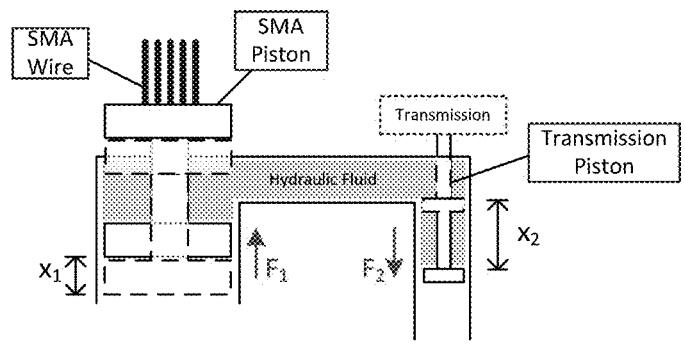
FIGS. 12 & 13 illustrates a hydraulic mechanism according to one embodiment of the invention.

The use of a hydraulic transmission can be used for SMA stroke amplification when considering basic hydraulic amplification principles. This stroke amplification can be achieved by allowing SMA wires linked to a piston to displace a volume of fluid which is connected, by a hydraulic line, to a piston of a lesser face surface area than that of the piston attached to the SMA. This will result in the smaller piston moving a greater distance than the SMA piston. This leads to a greater stroke length with lesser force, caused by the SMA wire contraction. FIG. 12 illustrates this mechanism.

It can be seen from FIG. 12 that by transmitting the displacement of the SMA to a smaller piston, a greater displacement of lesser force can be achieved. This can be represented in the following mathematical statement;

$$x_1 < x_2$$

$$F_1 > F_2$$

The resulting deflection from the SMA contraction can be determined by considering that the volume displaced by the SMA piston head must be matched by the movement of the transmission piston head. FIG. 6 illustrates the volumes displaced in the system.

Figure 13:
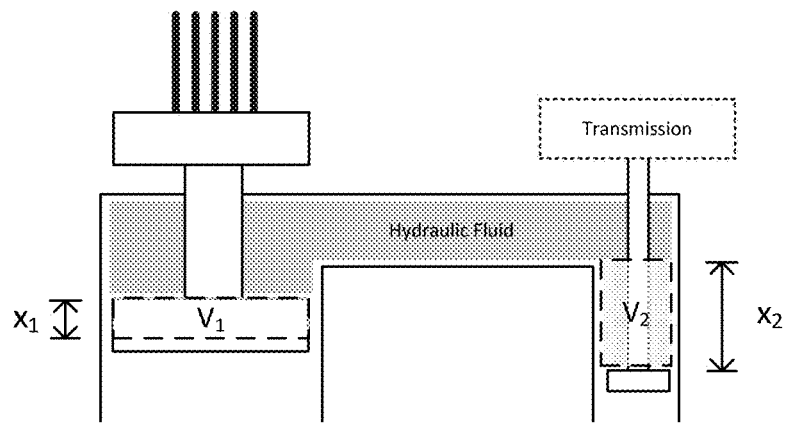

Considering FIG. 13, where $V_1$ is the volume displaced by the SMA piston and $V_2$ is the volume displaced by the transmission piston, the following procedure can be followed to determine the required transmission size given the diameter of SMA piston head ($d_1$) and its shaft ($d_{S1}$), the SMA contraction deflection ($x_1$) and the desired deflection of the transmission piston ($x_2$), as well as the transmission piston shaft ($d_{S2}$).

$d_1$=50 mm $d_{S1}$=20 mm $d_{S2}$=15 mm $x_1$=30 mm $x_2$=55 mm

Determine the volume displaced by the stroke of the main piston, accounting for the presence of the piston shaft which will not contribute to a volumetric change.

$$V_1 = \frac{\pi d_1^2}{4} \cdot x_1 - \frac{\pi d_{s1}^2}{4} \cdot x_1 = \frac{\pi 0.05^2}{4}(0.03) - \frac{\pi 0.02^2}{4} \cdot (0.03)$$

$$V_1 = 0.0000496 m^3$$

Determine the appropriate transmission head diameter based on the volume displaced by the main SMA actuated piston, and giving due consideration to the presence of the piston shaft.

$$V_2 = 0.0000496 = \frac{\pi d_2^2}{4} \cdot x_2 - \frac{\pi d_{s2}^2}{4} \cdot x_2$$

$$0.0000496 = \frac{\pi d_2^2}{4}(0.055) - \frac{\pi 0.015^2}{4} \cdot (0.055)$$

$$\frac{\pi d_2^2}{4}(0.055) = 0.0000496 + 0.00000972$$

$$d_2 = \sqrt{\frac{4(0.0000593)}{\pi(0.055)}}$$

$$d_2 = \sqrt{0.00137m} \cong 37mm$$

The procedure outlined above can be used to specify the transmission piston head diameter; however, this method may be arranged in such a way so that it can be used to define other geometries of the mechanisms.

The forces exerted by the pistons can also be found mathematically. These values can be determined by considering the relationship between work (W), force (F), distance (x);

Work=W=F.x

The force exerted by the SMA piston ($F_1$), imposing a value of 20 Joules of work being performed by the piston deflection, can be determined as follows;

$$W = 20J = F_1 \cdot x_1 = F_1(0.03)$$

$$F_1 = \frac{20}{0.03} = 666N$$

The force exerted by the transmission piston ($F_2$), considering that both pistons are performing the same amount of work, is found as is shown below;

$$W = F_2 x_2 = F_2(0.055)$$

$$F_2 = \frac{20}{0.055} = 363.6N$$

Hence, it can be seen that the force exerted by the main SMA actuated piston will be greater than that experienced by the transmission piston.

It is possible to combine both the hydraulic amplification discussed above with the compound hydraulic transmission concept discussed in FIG. 10(b). This would involve implementing the hydraulic amplification arrangement in place of the simple 1:1 hydraulic transmission shown in FIG. 10. This combination arrangement is shown in FIG. 14.

Figure 14:
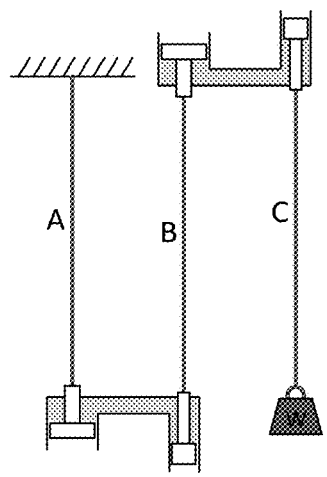
FIG. 14 illustrates hydraulic amplification mechanism according to one embodiment of the invention.

It can be seen from FIG. 14 above that in addition to the 3 increase in deflection due to the arrangement discussed initially with 1:1 levers, there will also be the increased deflection associated with the hydraulic amplification implementing different sized pistons. For the example used above, using 1:2 displacement amplifying hydraulic arrangements, the following deflection will be experienced by the load, W.

Deflection undergone by:

SMA Wire A=$x_A$=z meters

SMA Wire B=$x_B$=(2$x_A$+z)meters

SMA Wire C=$x_C$=(2$x_B$+z)meters

Hence the total deflection ($x_j$) acting on the load can be represented as;

$x_j$=$x_C$=2$x_B$+z=2(2$x_A$+z)+z=2(2z+z)+z $x_j$=4z+2z+z=7z

Figure 7:
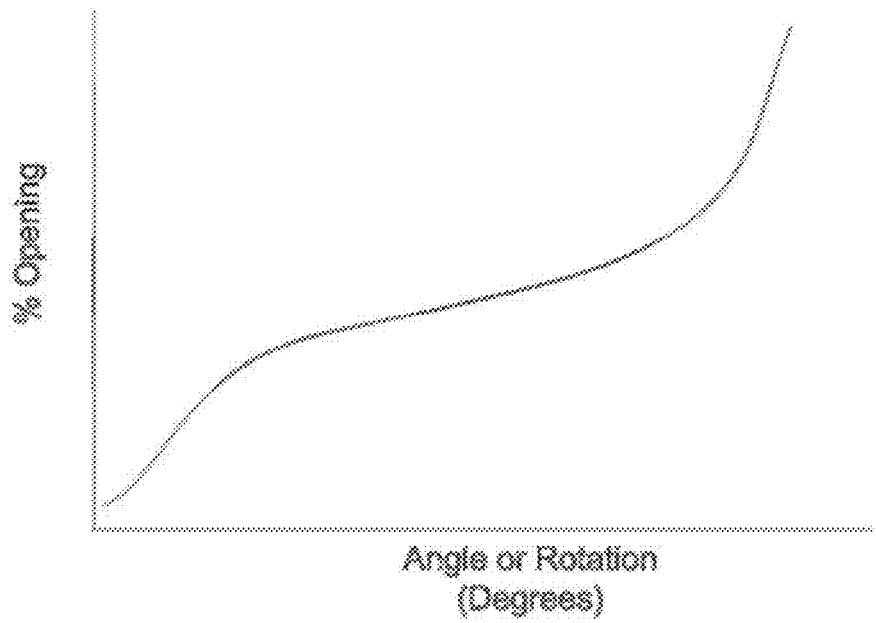
FIG. 7 illustrates opening profile for the modular SMA valve for different wire lengths.

Therefore it can be said that a core arrangement consisting of the components illustrated in FIG. 7 will allow for seven times the displacement of a single wire, without increasing the height of the core.

Figure 15:
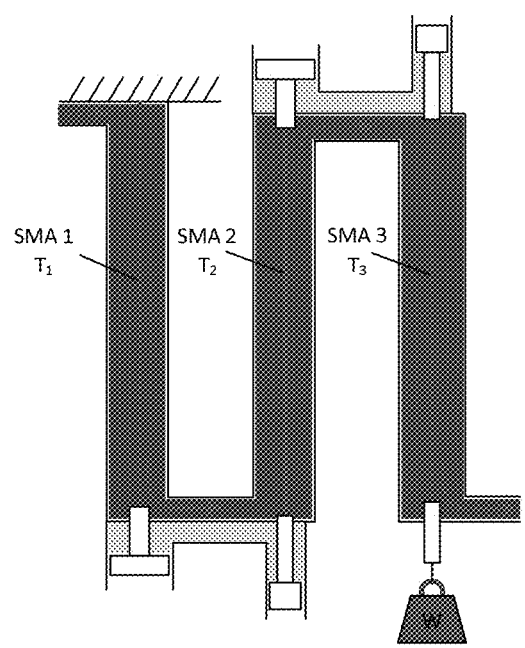
FIG. 15 illustrates a hermodynamic Cascade System—Heating fluid passes through each core sequentially.

Cascade System:

It will also be understood that a separate embodiment of the device can include SMA actuator elements being heated by a heating fluid in a sequence, whereby the output of one chamber becomes the input to the next and so on. This is shown in FIG. 15. In so doing, it is possible to create a thermodynamic cascade system, whereby the SMA elements are separated into individual chambers and the heated fluid supply passed through them in sequence. In this case, the water at each core entrance would be lower in temperature than that of the previous core, having given up some of its energy to the previous core.

To fully optimise this embodiment of the system, a different alloy might be used such that the reaction temperatures of the successive cores are progressively lower and lower. In this manner, it would be possible to optimize the system in order to extract the maximum possible energy from the fluid for conversion to mechanical work or to otherwise maximise the efficiency, power output, power density or any other such metric of performance of the system as a heat engine.

Fourth Embodiment

In another embodiment the invention provides a novel arrangement of SMA wires and springs that can be used to produce work through cyclic immersive heating and cooling of said SMA components. These SMA components can be arranged in an antagonistic fashion, so as to eliminate the need for relaxation forces, and hence improving the net power output of the components. An antagonistic arrangement using two single SMA wires is shown in FIG. 16.

Figure 16:
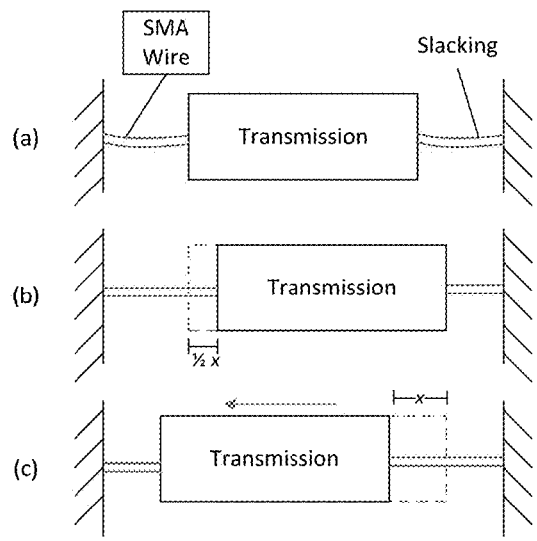
FIG. 16 illustrates antagonistic arrangement using two single SMA wires.

FIG. 16—Antagonistic operation using single wires, (a) the arrangement before start-up, where both sides are cooled (blue), shows that the wires are slacking, (b) As the right hand wire heats and contracts (red), half its displacement (x) contributes to tensioning both wires, while the rest of this displacement moves and is converted to work by the transmission, (c) As the left hand wire heats and contracts (and the right hand cools), its full displacement is converted to work, now that both wires are in tension.

As can be seen from FIG. 16, the use of just wires in this antagonistic arrangement results in a loss of work due to the initial condition of the wires slacking. The presence of slacking at the initial stage is required as the wires must be in tension only when one wire is heated. If the wires are tensioned when both wires are cooled, the heating of one will induce stress in its opposite cool wire, hence the relevant amount of slacking is necessary. The total displacement resulting from this is equal to the displacement caused by a single contraction of a wire (x) per stroke. This means that each wire is only contributing half its contraction to the work being drawn from the system (the other half would transition between the slacking wires to taught when alternating between heating and cooling the wires, ie wasted work). The addition of SMA springs to the component attempts to remedy this issue.

Figure 17:
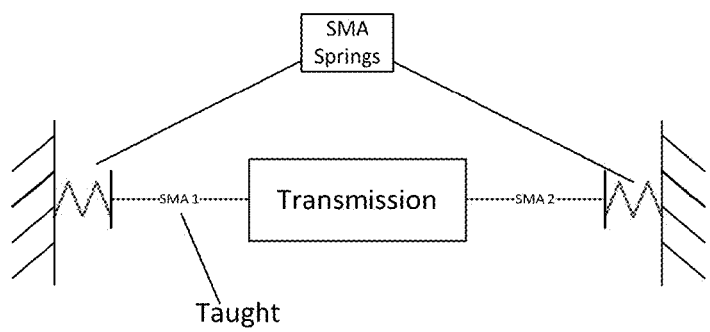
FIG. 17 illustrates antagonistic operation using SMA wires and springs.
Figure 18:
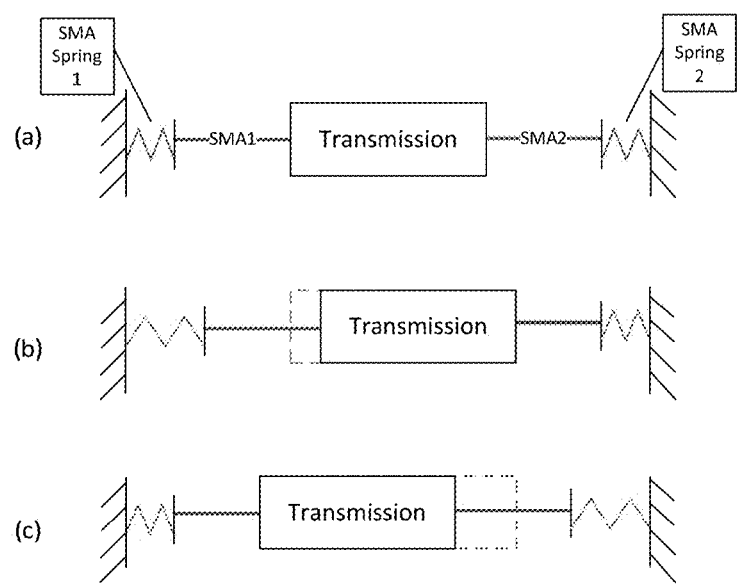
FIG. 18 illustrates operation of antagonistic actuator implementing wires & Springs.

FIG. 17 illustrates the embodiment of a component which utilises both SMA wires and springs. The function of these SMA springs is to operate in two states. These two states will be created by heating or cooling the wires. In the spring's heated state it will act as a "fixed" point for the corresponding connecting SMA wire. In the spring's cooled state it will act as a lenient connection point for its corresponding SMA wire. This will result in the SMA wires being constantly in tension. These states are achievable through the properties of the SMA which cause the material to become rigid when heated, and flexible when cooled. The SMA wire and spring will be located in the same chamber, where they will be immersively heated and cooled sequentially. FIG. 18 below shows the operation of this SMA actuator embodiment in situ.

It can be seen in FIG. 18 that in its closed position (all SMA components cooled), the SMA wires are taught. From this position (b) illustrates that as the SMA2 wire and SMA spring 2 are heated, they contract and become rigid respectively. The opposite occurs as the SMA1 wire and SMA spring 1 cool, and the spring becomes lenient. Due to the fact that the cooled SMA1 wire is in tension, the transmission component will be moved by the displacement created by the contracting wire, SMA2. In (c), the heating and cooling is reversed. As the SMA1 wire and SMA spring 1 are heated they will both contract. The wire will contract by a percentage of its length, and the spring will revert to a rigid more compressed state. The other wire and spring will cool causing the wire to expand linearly, and the spring will become lenient. This operation will cause the transmission component to move back through its previous displacement caused in (b), and move further the displacement caused by the contraction of the SMA1 wire and SMA spring 1. This results in a greater displacement caused by the concept discussed previously, and hence maximum force will be extracted from the displacement of the antagonistic wires.

The mechanism can repeat steps (b) and (c) creating a cyclical reciprocating linear motion. This movement or work can then be used to drive a shaft or operate a valve. Where this mechanism is used to drive a shaft, it would require a transmission which would convert the reciprocating movement into a continuous unidirectional rotation. A transmission arrangement which would satisfy this requirement is shown in FIGS. 19 and 20.

Figure 19:
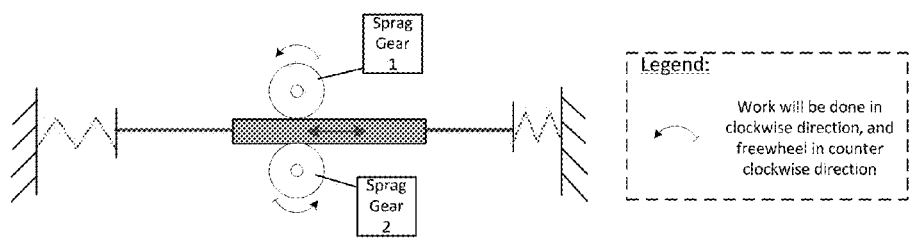
FIG. 19 illustrates a front view showing mating location of transmission to SMA actuator.
Figure 20:
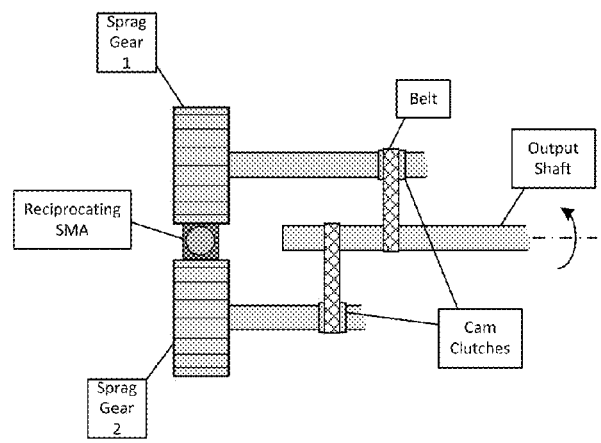
FIG. 20 illustrates a side view of a transmission system.

As can be seen from FIGS. 19 and 20, the transmission consists of two sprag gears which are mated with the reciprocating SMA wires. These sprag gears are set to "freewheel" in the same direction if located above and below the wire, or in opposing directions if both are placed above or below the wire. This will allow for one sprag to transmit work when there is a movement from right to left (sprag gear 1) while the other gear does work when there is movement from left to right. These gears will freewheel when its opposing gear is doing work, thus allowing for virtually continuous work output from the reciprocating linear movement. This is primarily illustrated in FIG. 19.

Figure 21:
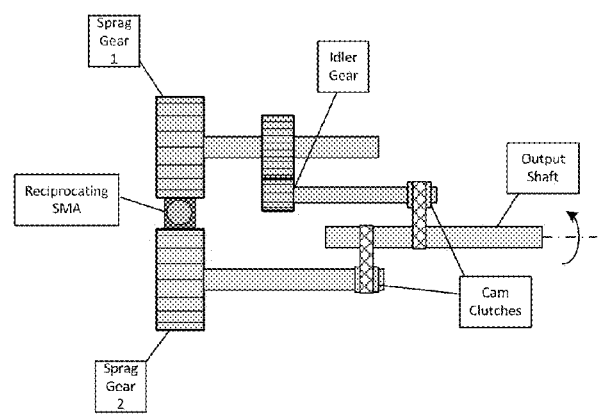
FIG. 21 illustrates transmission implementing an idler gear.

In the configuration shown in FIG. 20, the gears will do work in the same direction, where the sprag gears arranged in such a way that would result in them doing work in the opposite directions, an idler gear can be implemented in order to allow both gears to drive a shaft in a continuous unidirectional rotation. This gear can be placed between one of the sprag gear shafts and the output shaft. The purpose of an idle gear is to reverse the direction of rotation, without altering the speed. This would then allow for both sprag gears to be connected to the same output shaft. This arrangement is shown in FIG. 21.

Figure 22:
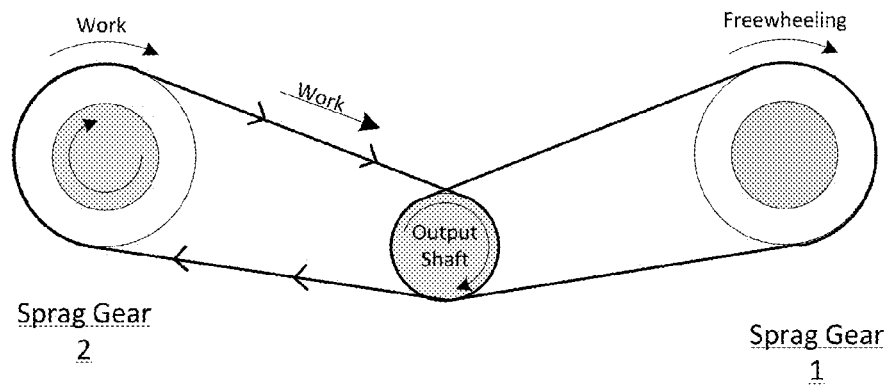
FIG. 22 illustrates a cam clutch operation.

Due to the fact that both sprag gears are connected to the output shaft, a device needs to be put in place to prevent rotation of the output shaft caused by sprag gear 1 affecting the movement of sprag gear 2, and vice versa. If this were to occur, the rotation of the shaft caused by one gear will cause the gear which is freewheeling to change direction, which will be the opposite direction of the working gear. This can cause the transmission to halt, and hence, would not produce any work. The cam clutch allows work to be transmitted from a shaft only when said shaft is rotating, and freewheels when a shaft is not doing work. This will prevent the sprag gears from interacting with each other. The cam clutches are located on each of the two shafts connecting to the output shaft, as can be seen from FIG. 20. Their operation is shown in FIG. 22 below, where the sprag gear 2's shaft is performing work, and sprag gear 1's shaft is allowed to free wheel, and vice versa.

The output shaft may then be used to generate power using a flywheel which can be located at its distal end. Another application for this work could be to drive a cam train. This could then be used to operate various valves within the system.

Figure 23:
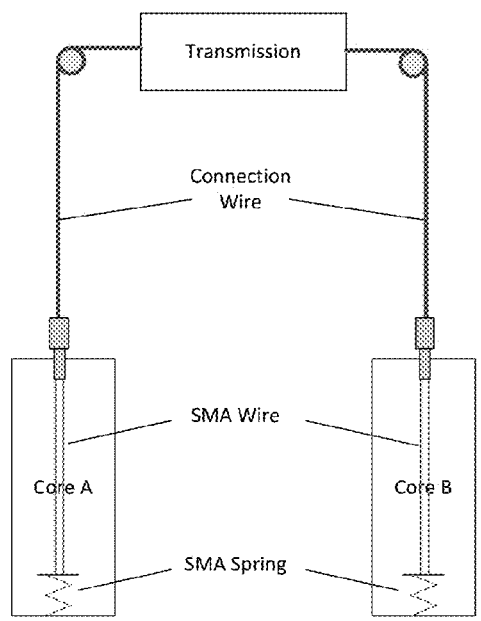
FIG. 23 illustrates how the SMA wire/spring arrangement could be represented as a core in the drive.

As discussed previously, the operation of the invention disclosed in this document can be used to generate power. In the context of the energy recovery device of the present invention, the invention can be used within the power producing cores. These cores are cyclically heated and cooled, and, hence, represent ideal operating conditions for this device. FIG. 23 shows how the SMA wire/spring arrangement can be represented as a core in the drive.

Figure 24:
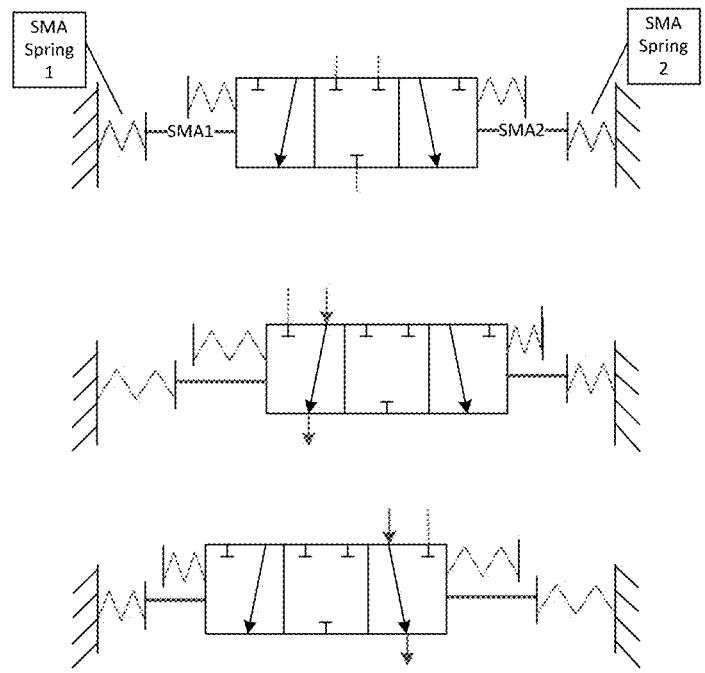
FIG. 24 illustrates a SMA actuated spool valve.

As mentioned previously, the wire/spring arrangement could also be used to operate a single valve. This could be achieved through the use of a spool valve. An example of this is shown in FIG. 24 below. This is a 3/3 solenoid valve, where the solenoid component which is used to operate it is replaced by the SMA components. It can also be seen from this diagram that using the SMA components put forth in this document it is possible to dictate the position of this valve into one of three states. These states could be off, hot fluid to outlet, or cold fluid to outlet. These valves could be utilised in the drive by operating them with the fluid which they direct. This will increase the overall efficiency of the system.

Model

Hooke's law can be used to describe the characteristics of the spring with regards to the displacement of the spring when a force is applied. It can be stated as;

$$F=-kx$$

Where F is force applied, k is the spring constant, and x is the displacement caused.

The properties of SMA cause its stiffness (which is proportional to the spring constant) to change as it changes between its martensitic and austenitic phases. This is due to a change in the Young's modulus (Y) of the material, which is related to the modulus of rigidity (G) of the SMA through the following equation;

$$G = \frac{E}{2(1+\mu)}$$

Where μ is the Poisson's ratio of the SMA. This equation shows a direct relationship between the Young's modulus and the modulus of rigidity. It can be said, therefore, that the rigidity of an SMA spring will vary as a result of its phase change. It is known that the Young's modulus of an SMA material which is in its heated (austenitic) phase is higher than that of its cooled (martensitic) state. Hence, it can be concluded that the stiffness of an SMA spring will increase when it is heated, and decrease when cooled. Furthermore, using Hooke's law, it can be seen that the amount of deflection caused by a force applied to the SMA spring will be smaller when said spring is heated, and larger when cooled.

In the application of the invention discussed, the SMA springs can be designed in such a way that the martensitic SMA spring will allow for a deflection equal to that of its opposing SMA wire (when heated). When these SMA springs heat and subsequently contract, they will allow significantly less deflection. This suggests that the heated spring will allow for some deflection, however, this would be partially offset by the linear contraction of the SMA spring.

Figure 25:
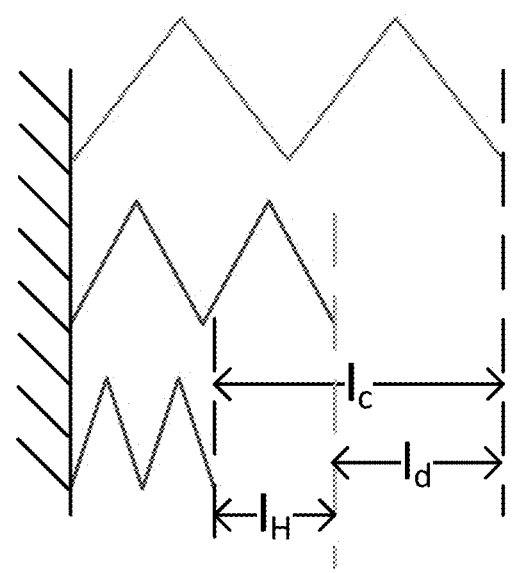
FIG. 25 illustrates a number of SMA spring states.

The additional displacement created by the SMA springs can be calculated as shown in FIG. 25.

Where $l_C$ is the distance between the distal end of the SMA spring when in a cooled and loaded state and the distal end of the spring when in a heated and unloaded state, $l_H$ is the distance between the distal end of the spring when in a heated loaded state and in a heated unloaded state, and $l_d$ is the difference between $l_C$ and $l_H$.

It can be concluded that from FIG. 25 that the additional displacement created over the valve concept discussed previously can be expressed as;

$$l_d = l_C - l_H$$

Furthermore, the overall displacement achieved by the SMA wire/spring configuration per stroke can be described mathematically as;

$$l_v = l_W + l_d$$

Where $l_W$ is the deflection created by the contraction of one length of SMA wire.

Figure 26:
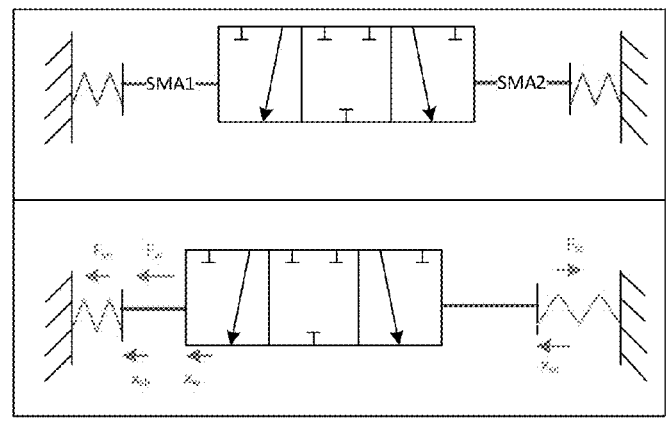
FIG. 26 illustrates a SMA actuated spool valve force & displacement analysis.

FIG. 26 shows the displacements and forces acting in the system, where the SMA wires act as relaxation springs. The extension required of the SMA spring in its martensitic phase will be sufficient to accommodate the contraction of its opposing SMA wire. The required extension of the spring can be calculated as follows;

Displacement of Contraction of SMA wire=$x_w$
Displacement of martensitic spring=$x_{sc}$
Displacement of austenitic spring=$x_{sh}$ Therefore, the total net extension of the martensitic spring ($x_t$), when accounting io for the extension of the opposing austenitic spring, can be expressed as;

$$x_t = x_{sc} - x_{sh}$$

Hence the required extension of the martensitic spring can be found using the following equation;

$$x_{sc} = x_W + x_{sh}$$

Where $x_W$ is the displacement caused by the contraction of the wire when changing from its martensite phase to its austenite phase.

Using Hookes law, the required spring constant of the martensitic spring can be found as follows;

$$F = -kx$$

$$-k = \frac{F}{x_{sc}}$$

The force (F) acting of the spring will be that caused by the contracting wire ($F_w$) combined with the contraction force caused by the austenitic spring ($F_s$), as shown in FIG. 11. This force can be expressed as shown below;

$$F = F_w + F_s$$

Finally, the required spring constant for the martensitic SMA spring can be found by subbing this equation into Hookes law equation;

$$-k = \frac{F_w + F_s}{x_w + x_{sh}}$$

The SMA spring used in the system may be sized by considering the calculations discussed above. This spring will have the desired properties in its martensite phase (required displacement) and also have the desired properties in its austenite phase (greater stiffness). It should be noted that design considerations discussed apply to the spring in its martensitic state. This means that the properties of the spring in its austenitic phase will be dependent upon these calculations. However, it is possible to design for the austenitic phase, and have the martensitic spring's properties be dependent upon those calculations.

Fifth Embodiment

A novel heat recovery system is under development which uses Shape Memory Alloy (SMA) to generate power from low grade heat. This is accomplished through the sequential immersion of the SMA wire in hot and cold fluid streams, typically expected to be water under low to medium pressures as would be experienced in standard industrial and commercial heating systems.

During thermal cycling, the shape memory alloy goes through a solid-solid phase change (austenite→martensite and martensite→austenite). The thermal cycling of the shape memory alloy is done in controlled conditions and is achieved by immersion in hot/cold water.

Shape Memory Alloy can display two possible "effects": The one-way effect and the two-way effect.

The one-way effect is in the "natural" state of the wire system i.e. if the two-way effect isn't embedded in the behaviour of the shape memory alloy, external load is needed to be applied in order to achieve the austenite→martensite transformation, i.e. through a relaxation force.

Essentially, in the one-way effect scenario, the shape memory alloy remembers only its parent state (hot shape) and needs a load to be applied to achieve its cold shape.

In the system presently described, the wires are immersed in pressurised water io columns. When using at most 4-5 SMA wires in a bundle, providing the relaxation force using the weight of the column of water and some additional weights is quite straight forward. But when one deals with a bundle composed of numerous wires (for example c.70 shape memory alloy wires), as would be required in a system aimed at industrial scale power production, the relaxation force is harder to apply.

In order to obtain a certain deflection, a certain amount of relaxation force has to be provided to the SMA bundle. This relaxation force is generally only a small fraction of the force that is recoverable from the wire i.e. it represents a minor parasitic load on the successful operation of the SMA as a power producing element.

The present invention describes a system whereby in order to be able to provide the exact amount of relaxation force a second core (the relaxation force core) is to be coupled with the main power producing core via a mechanical linkage or otherwise. The relaxation core would have to have the same dimensions as the main power producing core in order to keep the rate of cooling/heating in sync with the main core (not putting supplementary strain on the wires), but the SMA bundle is specified in such a way that it would provide the exact amount of relaxation force needed by the main power core to achieve the austenite→martensite transformation.

Figure 27:
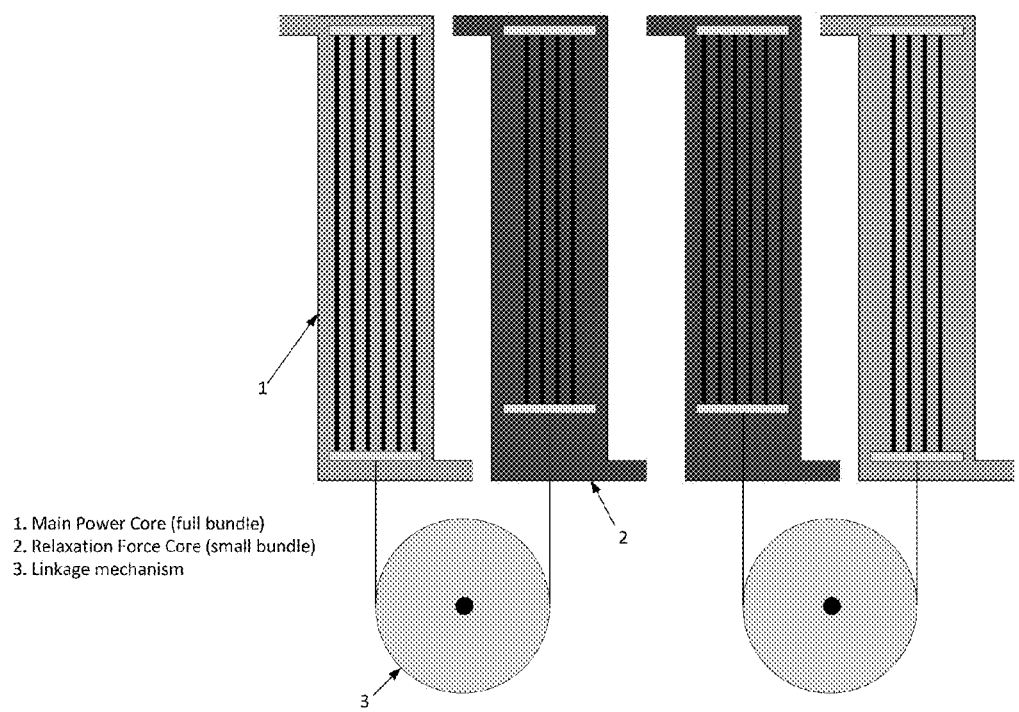
FIG. 27 illustrates an antagonistic core arrangement for net power production.

When the main power producing core would go through martensite→austenite transition it would provide the relaxation force for the relaxation core, and still transmit a certain amount of force to the transmission for net power production (FIG. 27).

Thus, the central inventive step involved is the creation of an antagonistic Shape Memory Alloy system optimised specifically for net power production. This is done by coupling two SMA bundles such that one is smaller than the other. The smaller SMA bundle is sized specifically to provide the relaxation force for the larger core and is coupled to the larger core to enable delivery of this relaxation force. Whilst antagonistic SMA systems are well known and have been under investigation for some time in different quarters, the system of the invention provides an explicit optimisation for net power output has been described.

The amount of relaxation force required by the primary (power producing) core influences the number of wires in the secondary (relaxation) bundle needed to deliver this force. Thus, keeping the relaxation forces to a minimum value is beneficial in terms of the system size. The following innovations describe ways in which either this relaxation force might be reduced, removed or otherwise optimized for performance.

1. Two-way Training of the Alloy

Two-way effect: the shape memory alloy remembers only its parent state (hot shape) and its cold shape without needing an external load to be applied during cycling.

In order to obtain the same deflection from the shape memory alloy, but reduce the amount of relaxation forces, and have as a result a smaller design, the shape memory alloy can be two-way trained. By two-way training, the wire memorises a cold shape. In order to have good results in terms of performance (the two-way training to be able to be imbedded successfully in the memory of the shape memory alloy), but also to have a long fatigue life, it is recommended to train the alloy to obtain a maximum 2% deflection (the difference in length between the hot and cold shapes).

2. Cascade System

In order for the system to be more efficient, the hot/cold water that went into the main power producing cores can be recirculated into the small cores (using the full potential of the fluid). Taking into consideration the physical limitation of the alloy (the material properties), the water flowing on top of it would only give away as much heat as the shape memory alloy is able to absorb and that wouldn't represent a significant cooling/heating of the fluid, therefore potential io (useful energy) is still transported by the water. This represents a typical thermodynamic cascade system where one element utilises the waste heat from a previous system.

3. Usage of Shape Memory Alloy with Lower Transformation Temperatures

As a consequence of the cascade system the temperature of the hot/cold water will have slightly different temperatures than the water used to activate the SMA in the main cores. In order to ensure that the SMA would fully react even though the temperatures are slightly different for the second step of the cascade an SMA with lower reaction temperatures would be necessary.

4. Usage of Shape Memory Alloy with Different Diameters in the Relaxation Fforce Core as Opposed to the Main Power Producing Core In order to reduce the dimensions of the relaxation core, higher diameter wires can be used. The amount of relaxation force needed by the main power producing core can be provided by only a few wires in the relaxation force core, if using wires/rods with a high enough diameter.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A modular energy device comprising a first SMA core housed in an immersion chamber and adapted to be sequentially filled with fluid to allow heating and/or cooling of the first SMA core wherein a shaft is adapted to be rotated by the first SMA core mounted concentrically around first shaft; and the first SMA core comprises a plurality of SMA elements to define a module, wherein a plurality of modules are mounted in series and whereby movement of a first module is configured to be input to a second module enabling cumulative rotation of the shaft; and a modular valve adapted to increase the overall efficiency of the energy device optimized on a predefined profile based on the SMA core.

2. The energy device of claim 1 wherein at least one lever mechanism is adapted to extend the stroke of said SMA wires during heating of the core.

3. The energy device of claim 1 wherein the SMA elements are selected from different lengths of SMA material.

4. The energy device of claim 1 wherein the SMA core is divided into a plurality of shorter elements, mounted radially around the circumference of shaft.

5. The energy device of claim 4 wherein the deflection of each of the elements are a function of the length of the element.

6. The energy device of claim 1 wherein the first core is mounted on the shaft in a spoked wheel arrangement.

7. The energy device of claim 1 wherein the predefined profile can be controlled by varying the length of the SMA core.

8. A SMA core for use in an energy recovery device comprising a modular valve adapted to increase the overall efficiency of the energy recovery device optimized on a predefined profile based on the SMA core, said core comprises a plurality of SMA elements to define a module, wherein a plurality of modules are mounted in series on a rotatable shaft and whereby movement of a first module is configured to be input to a second module enabling cumulative rotation of the shaft.

* * * * *